(12) United States Patent
Taguchi et al.

(10) Patent No.: US 12,405,757 B2
(45) Date of Patent: Sep. 2, 2025

(54) DISPLAY APPARATUS FOR DISPLAYING A POINTER IMAGE AND A MARK IMAGE IN DIFFERENT DISPLAY MODES

(71) Applicant: Panasonic Intellectual Property Management Co., Ltd., Osaka (JP)

(72) Inventors: Yuta Taguchi, Kanagawa (JP); Yoshihiko Komagata, Kanagawa (JP); Yoshinori Morino, Kanagawa (JP); Kazuya Shiroshita, Hiroshima (JP); Ryo Oshima, Kanagawa (JP); Takashi Harada, Kanagawa (JP); Daisuke Nagai, Kanagawa (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 217 days.

(21) Appl. No.: 18/116,032

(22) Filed: Mar. 1, 2023

(65) Prior Publication Data

US 2023/0280962 A1   Sep. 7, 2023

(30) Foreign Application Priority Data

Mar. 7, 2022   (JP) ................. 2022-034365

(51) Int. Cl.
*G09G 5/02* (2006.01)
*G06F 3/14* (2006.01)
(Continued)

(52) U.S. Cl.
CPC ............. *G06F 3/14* (2013.01); *B60K 35/00* (2013.01); *B60K 35/28* (2024.01); *B60K 2360/167* (2024.01); *B60K 2360/698* (2024.01)

(58) Field of Classification Search
CPC ..... G06F 3/14; B60K 35/28; B60K 2360/167; B60K 2360/698
(Continued)

(56) References Cited

U.S. PATENT DOCUMENTS

| 2008/0238913 | A1* | 10/2008 | Katoh ............... G12B 11/04 |
| | | | 345/418 |
| 2011/0235943 | A1* | 9/2011 | Ogasawara ............ G01D 7/00 |
| | | | 382/275 |
| 2017/0174081 | A1* | 6/2017 | Nojiri ................. B60K 35/00 |

FOREIGN PATENT DOCUMENTS

| JP | 04-328420 | 11/1992 |
| JP | 2000-321098 | 11/2000 |

(Continued)

OTHER PUBLICATIONS

Office Action from Japan Patent Office (JPO) in Japanese Patent Appl. No. 2022-034365, dated May 20, 2025, together with an English language translation.

*Primary Examiner* — Jonathan M Blancha
(74) *Attorney, Agent, or Firm* — Greenblum and Bernstein, P.L.C.

(57) ABSTRACT

A display panel is adapted to display at least one meter image including a pointer image constituting a pointer and a mark image constituting a mark that the pointer is adapted to point to. A processor controls the display state of the pointer image. The processor causes the pointer image to be displayed on the display panel when the pointer image does not point to the mark image and causes the pointer image to be displayed on the display panel in a second display mode when the pointer image points to the mark image. The first display mode and the second display mode are different.

7 Claims, 11 Drawing Sheets

(51) Int. Cl.
*B60K 35/00* (2006.01)
*B60K 35/28* (2024.01)

(58) Field of Classification Search
USPC .......................................................... 345/694
See application file for complete search history.

(56) References Cited

FOREIGN PATENT DOCUMENTS

| | | |
|---|---|---|
| JP | 2009-015284 | 1/2009 |
| JP | 4404135 | 1/2010 |
| JP | 5202861 | 6/2013 |
| JP | 5795913 | 10/2015 |
| JP | 6227721 | 11/2017 |
| JP | 2018-115998 | 7/2018 |

* cited by examiner

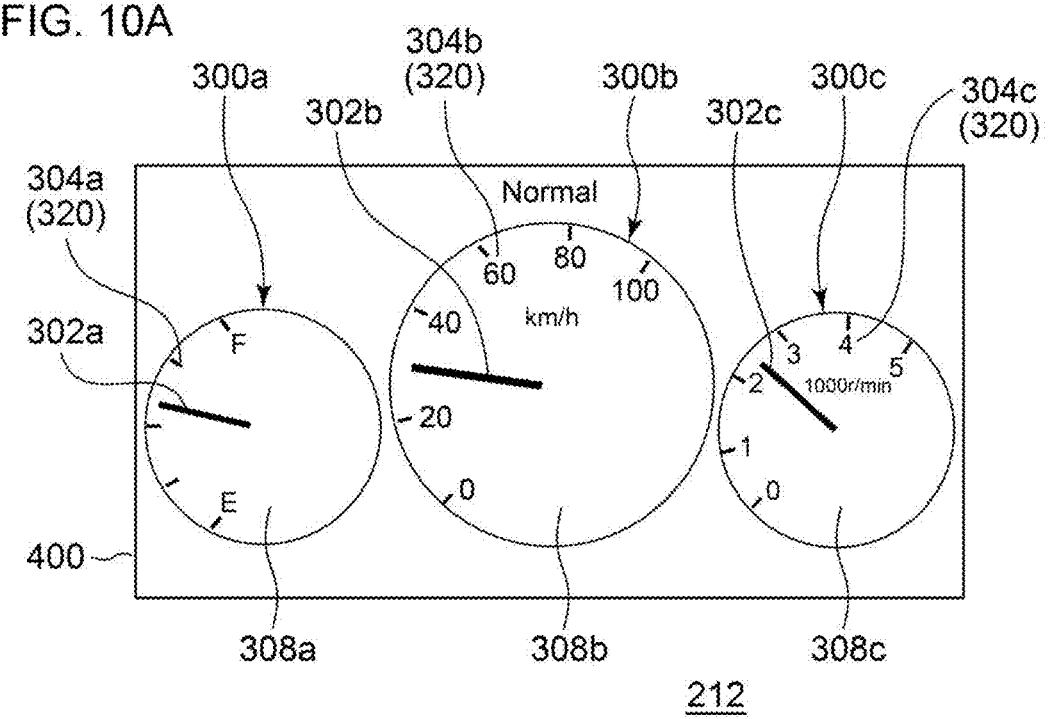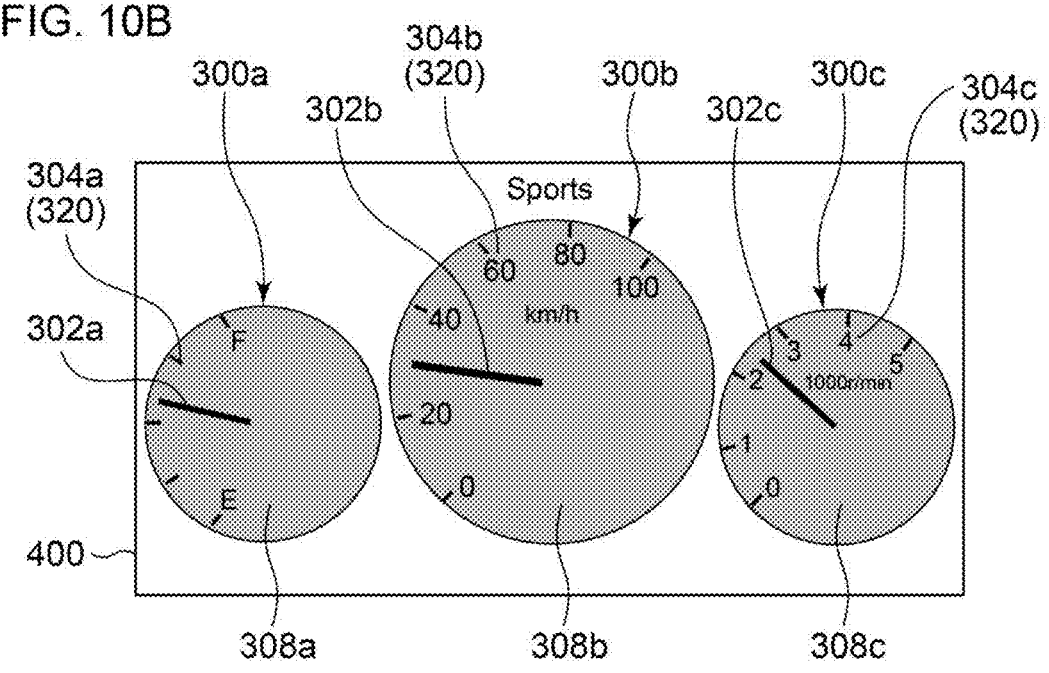

DISPLAY APPARATUS FOR DISPLAYING A POINTER IMAGE AND A MARK IMAGE IN DIFFERENT DISPLAY MODES

BACKGROUND

1. Field

The present disclosure relates to display apparatuses.

2. Description of the Related Art

Some display apparatuses for vehicles are configured to cause a pointer image constituting a pointer and a mark image constituting a mark to be displayed on a display panel. When a pointer image and a mark image overlap in the display apparatus, the portion of the pointer image overlapping the mark image is displayed in brightness or hue different from the brightness or hue of the portion of the pointer image elsewhere (see, for example, patent literature 1).
[Patent literature 1] JP2009-15284

Human eyes are characterized by the ability to "see an object stereoscopically by integrally processing two items of visual information as viewed from the left and right eyes (e.g., "shift" between the left and right images) in the brain". For example, the case of changing related-art physical pointers to pointer images displayed on a display panel in display apparatuses for a vehicle adapted to display meter images will be considered. In this case, stereoscopic recognition may become difficult for human eyes, and the visibility of a mark will be lowered when the pointer and the mark overlap.

SUMMARY

The present disclosure addresses the above-described issue, and a purpose thereof is to provide a technology of suppressing a drop in the visibility of a meter image.

A display apparatus according to an embodiment of the present disclosure includes: a display panel adapted to display at least one meter image including a pointer image constituting a pointer and a mark image constituting a mark that the pointer is adapted to point to; and a display controller that controls the display panel, wherein the display controller causes the display panel to display the pointer image in a first display mode when the pointer image does not point to the mark image and causes the display panel to display the pointer image in a second display mode when the pointer image points to the mark image, and the first display mode and the second display mode are different.

Another embodiment relates to a display apparatus. The apparatus includes: a display panel adapted to display at least one meter image including a pointer image constituting a pointer and a mark image constituting a mark that the pointer is adapted to point to; and a display controller that controls the display panel, wherein the display controller causes the display panel to display the pointer image and the mark image in a first display mode when the pointer image points to the mark image and an amount of movement of the pointer image per unit time is smaller than a threshold value and causes the display panel to display the pointer image and the mark image in a second display mode when the pointer image points to the mark image and the amount of movement of the pointer image per unit time is equal to or greater than the threshold value, and the first display mode and the second display mode are different.

Optional combinations of the aforementioned constituting elements, and implementations of the disclosure in the form of methods, apparatuses, systems, recording mediums, and computer programs may also be practiced as additional modes of the present disclosure.

BRIEF DESCRIPTION OF THE DRAWINGS

Embodiments will now be described, by way of example only, with reference to the accompanying drawings that are meant to be exemplary, not limiting, and wherein like elements are numbered alike in several figures, in which:

FIGS. 10A-10B show examples of the meter screen displayed on the display panel according to variation 2.

DETAILED DESCRIPTION

The invention will now be described by reference to the preferred embodiments. This does not intend to limit the scope of the present invention, but to exemplify the invention.

Embodiment 1

Before describing the embodiment in specific details, a summary of the embodiment will be described. Embodiment 1 relates to a display apparatus for electronically displaying images of various meters. The display apparatus is provided, for example, in an instrument panel of a vehicle. Hereinafter, images showing various meters will be referred to as "meter images". The meter image is, for example, an image of a fuel meter, an image of a speed meter, and an image of a tachometer. A meter image includes a pointer image constituting a pointer and a mark image constituting a mark that the pointer is adapted to point to. In the related art, the portion of the pointer image overlapping the mark image and the portion not overlapping the mark image may sometimes be displayed in different levels of brightness or hue in order to improve the visibility of the mark image when the pointer image and the mark image are displayed to overlap each other. Meanwhile, human eyes see an object stereoscopically by integrally processing two items of visual information as viewed from the left and right eyes (e.g., "shift" between the left and right images) in the brain". When a related-art physical pointer is changed to a pointer image in a display apparatus for a vehicle adapted to display meter images, therefore, the visibility of a mark may be lowered due to lowered stereoscopic recognition capability of human eyes when the pointer and the mark overlap. It is therefore useful to suppress a drop in the visibility of a mark image even in the case of a planar meter image. In this embodiment, the mode of a pointer image, e.g., the shape, is changed when the mark image and the pointer image overlap.

Figure 1:
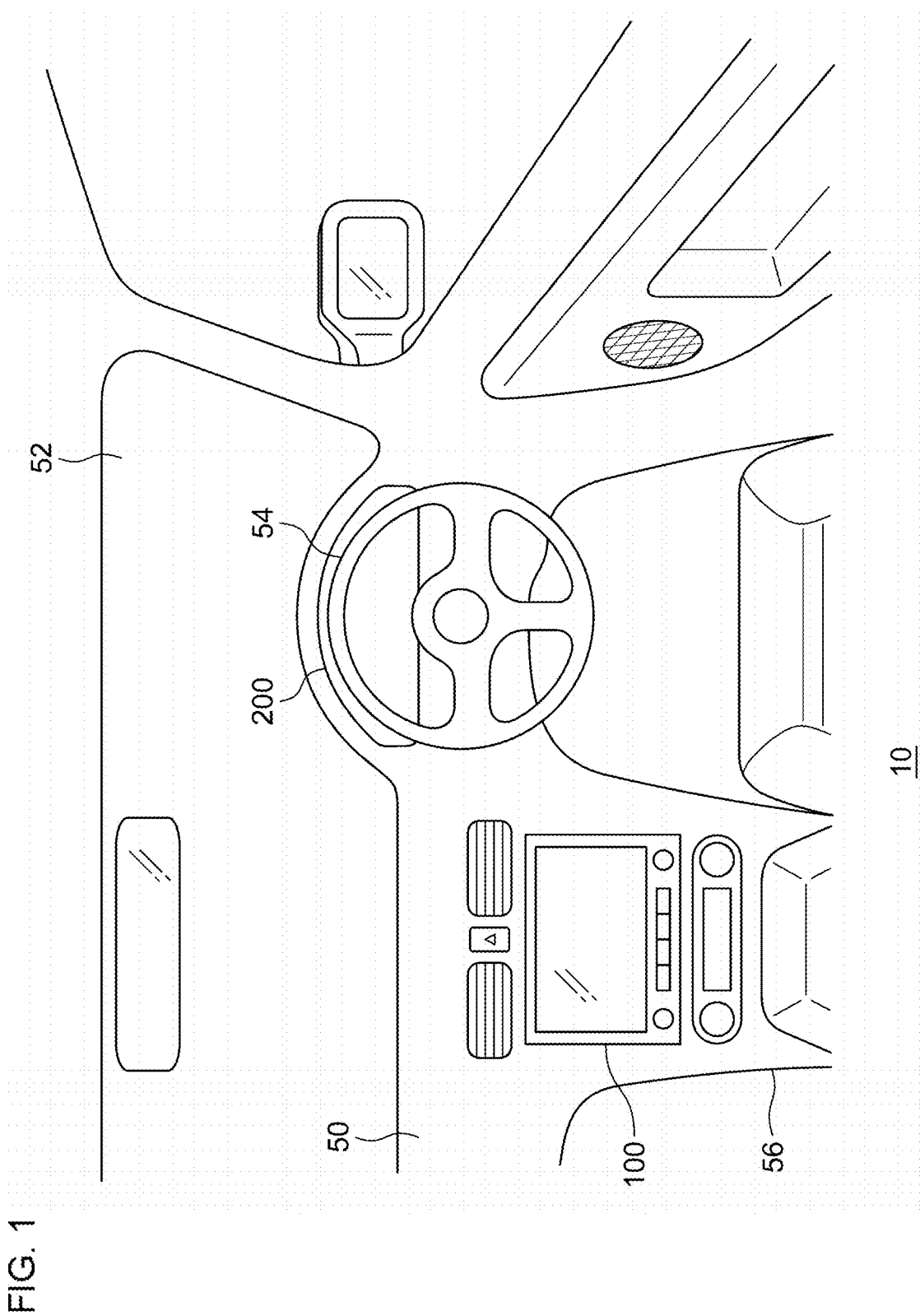
FIG. 1 shows a structure in a vehicle cabin of a vehicle according to embodiment 1.

FIG. 1 shows a structure in a vehicle cabin of a vehicle 10. A windshield 52 is provided in front of a dashboard 50 provided frontward in the vehicle cabin. A steering wheel 54 is provided to the right of the dashboard 50. The steering wheel 54 may be provided to the left of the dashboard 50. A display apparatus 200 is provided in front of the steering wheel 54, and, for example, in an instrument panel of the vehicle 10. The display apparatus 200 is also referred to as an electronically displayed meter. A center console 56 extending vertically is provided in the central portion of the dashboard 50. A vehicle-mounted monitor 100 is set within the center console 56. The vehicle-mounted monitor 100 displays, for example, a map image of a car navigation system.

Figure 2:
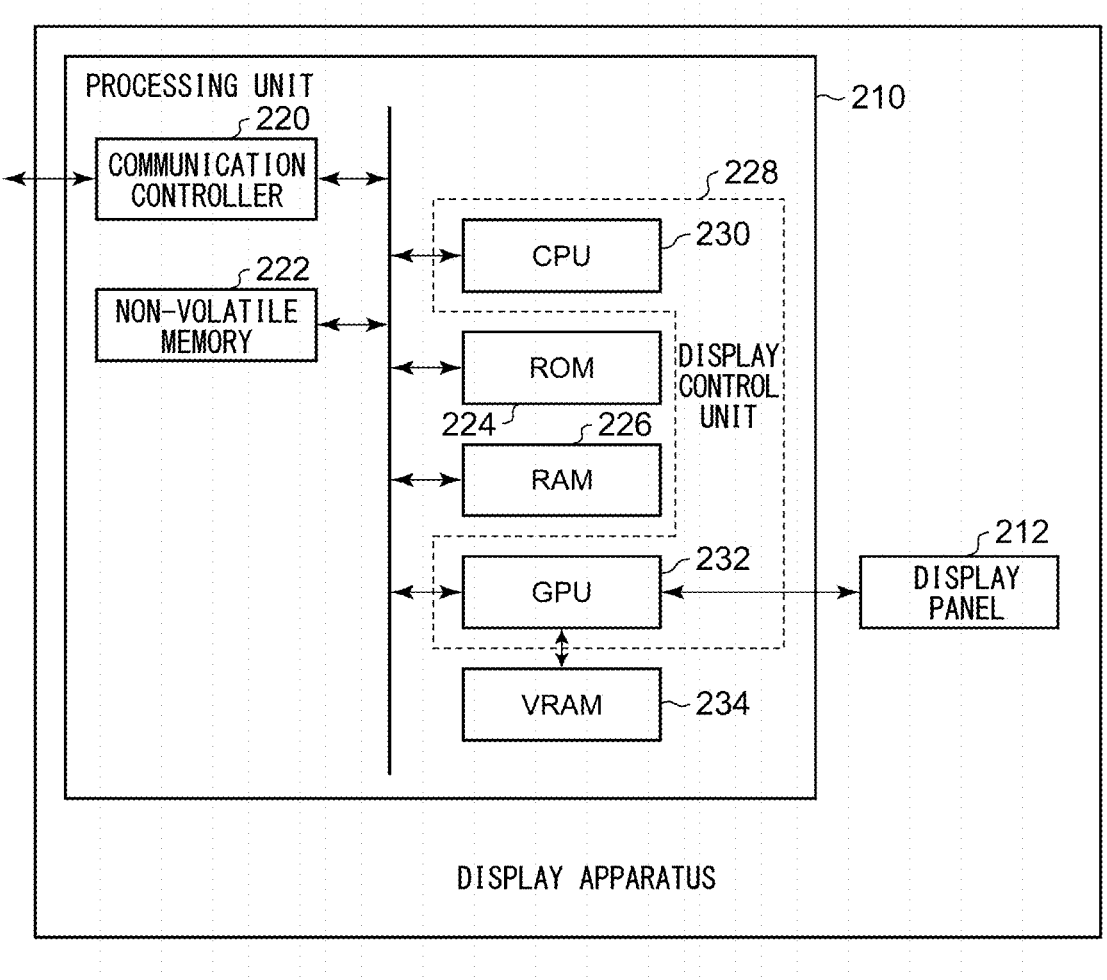
FIG. 2 shows a configuration of the display apparatus of FIG. 1.

FIG. 2 shows a configuration of the display apparatus 200. The display apparatus 200 includes a processing unit 210 and a display panel 212. The processing unit 210 includes a communication controller 220, a non-volatile memory 222, a ROM 224, a RAM 226, a central processing unit (CPU) 230, a graphics processing unit (GPU) 232, and a video random access memory (VRAM) 234. The CPU 230 and the GPU 232 may be packaged as a display control unit 228.

The communication controller 220 receives vehicle information from various electronic control units (ECU) and various sensors via a vehicle-mounted network in accordance with a predetermined communication standard. The vehicle-mounted network is exemplified by a controller area network (CAN), a universal asynchronous receiver/transmitter (UART), a joint test action group (JTAG), etc. For example, the communication controller 220 receives fuel information from an ECU connected to a fuel sensor, receives vehicle speed information from an ECU connected to a vehicle speed sensor, and receives engine revolution information from an ECU for managing the engine. Further, the communication controller 220 receives average fuel cost information from an ECU. Further, the communication controller 220 is connected to an interface for acquiring information necessary for screen display from the driver. The communication controller 220 outputs the vehicle information received to the CPU 230.

The non-volatile memory 222 is a large capacity storage. For example, a flash memory or a hard disk is used as the non-volatile memory 222. The non-volatile memory 222 stores various application programs and various data. The non-volatile memory 222 also stores image data. The image data is inclusive of, for example, vertex data, texture data, polygon data, etc. of the parts constituting an image. The ROM 224 is a read-only non-volatile memory and stores firmware and basic data. The ROM 224 can store programs, image data, and polygon data that need not be rewritten. The RAM 226 is a read/write enabled volatile memory and is used as a work area of the CPU 230. The CPU 230 reads the program and data from the non-volatile memory 222 and the ROM 224 into the RAM 226 and performs various processes.

The GPU 232 is a custom IC specialized for image processes such as image rendering and color correction and generates an image that should be displayed on the display panel 212. The VRAM 234 is a read/write enabled volatile memory and is used as a work area of the GPU 232. For example, the VRAM 234 has an area for storing data dealt with in the GPU 232, a storage area for reading texture data, and a frame buffer area. The VRAM 234 stores polygon data and textures. The VRAM 234 may be incorporated into the RAM 226.

The display control unit 228, which includes the CPU 230 and the GPU 232, generates a meter screen showing a plurality of meters based on the vehicle information received from the communication controller 220. The meter screen generated in the display control unit 228 will be described later. The display control unit 228 displays the meter screen generated on the display panel 212. When the vehicle information received is updated, the display control unit 228 updates the meter screen and displays the updated information on the display panel 212. Thus, the display control unit 228 controls the display state of the display panel 212. The display panel 212 is a display. The display panel 212 is, for example, a liquid crystal display or an organic EL display. The display panel 212 displays an image output from the processing unit 210, i.e., a meter screen rendered by the GPU 232 in the frame buffer.

Figure 3:
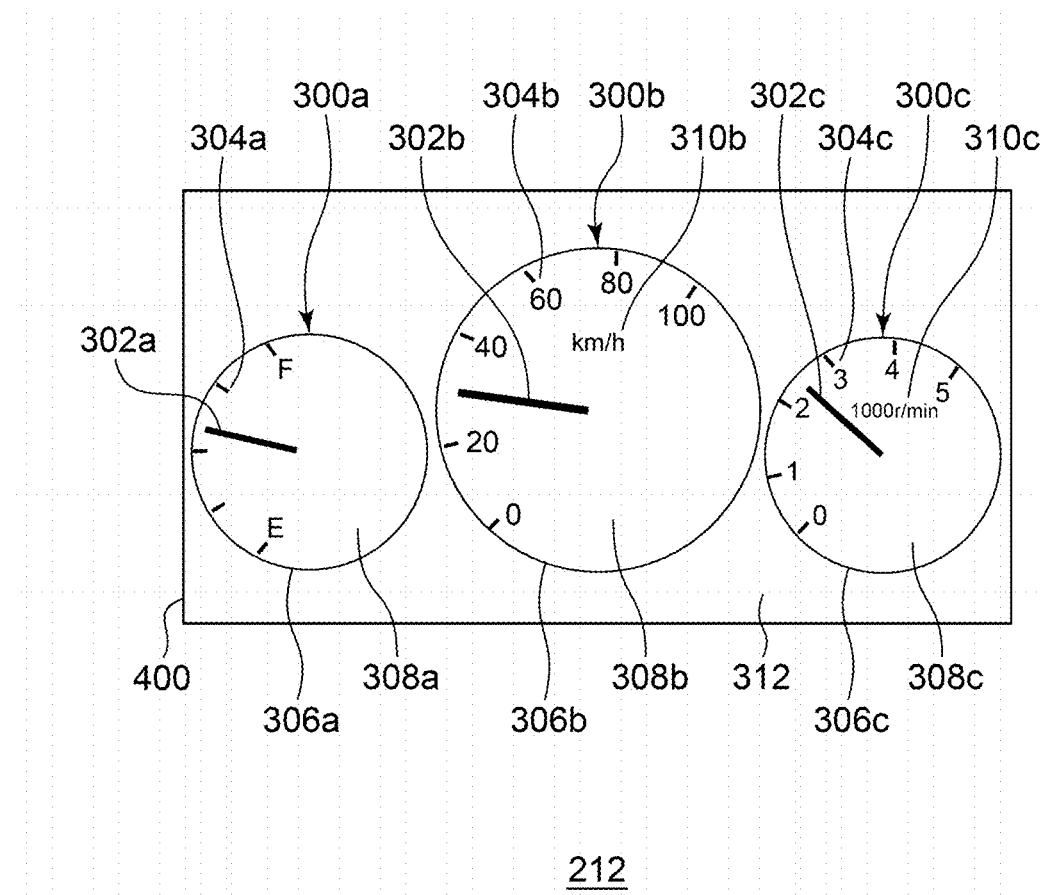
FIG. 3 shows a basic configuration of a meter screen displayed on the display panel of FIG. 2.

To describe a meter screen generated by the display control unit 228 and displayed on the display panel 212, FIG. 3 will also be used. FIG. 3 shows a basic configuration of a meter screen 400 displayed on the display panel 212. A first meter image 300a is provided at the left end of the meter screen 400 shown in FIG. 3, a second meter image 300b is provided to the right of the first meter image 300a, and a third meter image 300c is provided to the right of the second meter image 300b. The first meter image 300a, the second meter image 300b, and the third meter image 300c are generically referred to as meter images 300. A background image 312 is provided in the meter screen 400 to encircle the plurality of meter images 300. In this way, a plurality of meter images 300 and the background image 312 are displayed simultaneously in the meter screen 400. The number of meter images 300 in FIG. 3 is "3", but the number of meter images 300 may be "2". In that case, the third meter image 300c is omitted. Alternatively, the number of meter images 300 may be "4" or more.

The first meter image 300a is, for example, an image of a fuel meter. The first meter image 300a includes a first pointer image 302a, a first mark image 304a, a first outer frame image 306a, and a first dial face image 308a. The first pointer image 302a constitutes a pointer. The first mark image 304a constitutes a mark pointed to by the first pointer image 302a. The first outer frame image 306a constitutes a circular outer frame encircling the first mark image 304a. The first dial face image 308a constitutes a dial face positioned inside the first mark image 304a. The display control unit 228 of FIG. 2 determines the angle of the first pointer image 302a relative to the first mark image 304a based on the fuel information received from the communication controller 220 and generates the first meter image 300a in which the first pointer image 302a is oriented in the angle determined.

The second meter image 300b is, for example, an image of a speed meter. The second meter image 300b includes a second pointer image 302b, a second mark image 304b, a second outer frame image 306b, a second dial face image 308b, and a second unit image 310b. The second pointer image 302b, the second mark image 304b, the second outer frame image 306b, and the second dial face image 308b are shown in a manner similar to that of the first pointer image 302a, the first mark image 304a, the first outer frame image 306a, and the first dial face image 308a, respectively. The second unit image 310b shows a unit of the mark. The display control unit 228 of FIG. 2 determines the angle of the second pointer image 302b relative to the second mark image 304b based on the speed information received from the communication controller 220 and generates the second meter image 300b in which the second pointer image 302b is oriented in the angle determined.

The third meter image 300c is, for example, an image of a tachometer. The third meter image 300c includes a third pointer image 302c, a third mark image 304c, a third outer frame image 306c, a third dial face image 308c, and a third unit image 310c. The third pointer image 302c, the third mark image 304c, the third outer frame image 306c, the third dial face image 308c, and the third unit image 310c are shown in a manner similar to that of the second pointer image 302b, the second mark image 304b, the second outer frame image 306b, the second dial face image 308b, and the second unit image 310b, respectively. The display control unit 228 of FIG. 2 determines the angle of the third pointer image 302c relative to the third mark image 304c based on the revolution information received from the communication controller 220 and generates the third meter image 300c in which the third pointer image 302c is oriented in the angle determined.

The first pointer image 302a, the second pointer image 302b, and the third pointer image 302c are generically referred to as pointer images 302. The first mark image 304a, the second mark image 304b, and the third mark image 304c are generically referred to as mark images 304. The first outer frame image 306a, the second outer frame image 306b, and the third outer frame image 306c are generically referred to as outer frame images 306. The first dial face image 308a, the second dial face image 308b, and the third dial face image 308c are generically referred to as dial face images 308. The second unit image 310b and the third unit image 310c are generically referred to as unit images 310.

The third mark image 304c in the third meter image 300c shows numerals "0", "1", "2", "3", "4", and "5". The third pointer image 302c moves (rotates) in accordance with the change in the revolving speed of the engine. Overlapping of the third pointer image 302c on any of the numerals makes it difficult to see that numeral. It also makes it difficult to see the third pointer image 302c in motion. To address this, the display control unit 228 controls, as described below, the display of the third pointer image 302c or the display of the third pointer image 302c and the third mark image 304c.

Figure 4:
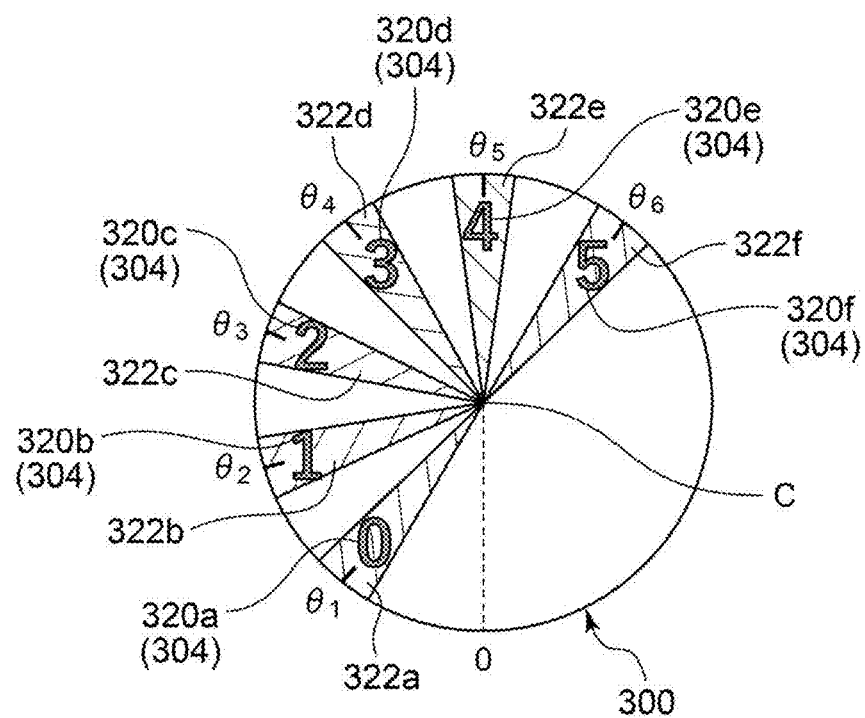
FIG. 4 shows an outline of the process in the display control unit of FIG. 2.

FIG. 4 shows an outline of the process in the display control unit 228. The figure shows a process whereby the display control unit 228 determines an angle (hereinafter, "pointer angle") of the third pointer image 302c in accordance with the revolving speed of the engine. For clarity of the description, the third meter image 300c, the third pointer image 302c, the third mark image 304c, etc. may hereinafter be indicated as the meter image 300, the pointer image 302, and the mark image 304. The numerals "0", "1", "2", "3", "4", and "5" in the mark image 304 are respectively shown as a first value image 320a, a second value image 320b, a third value image 320c, a fourth value image 320d, a fifth value image 320e, and a sixth value image 320f.

The display control unit 228 defines a coordinate system in which the 6 o'clock direction of FIG. 4 is "0 degrees" and the pointer angle increases in the clockwise direction. In this coordinate system, a predetermined angular range centered at the angle θ1 is a first mark range 322a, a predetermined angular range centered at the angle θ2 is a second mark range 322b, a predetermined angular range centered at the angle θ3 is a third mark range 322c, a predetermined angular range centered at the angle θ4 is a fourth mark range 322d, a predetermined angular range centered at the angle θ5 is a fifth mark range 322e, and a predetermined angular range centered at the angle θ6 is a sixth mark range 322f.

The first mark range 322a includes at least a portion of the first value image 320a, the second mark range 322b includes at least a portion of the second value image 320b, the third mark range 322c includes at least a portion of the third value image 320c, the fourth mark range 322d includes at least a portion of the fourth value image 320d, the fifth mark range 322e includes at least a portion of the fifth value image 320e, and the sixth mark range 322f includes at least a portion of the sixth value image 320f. The first mark range 322a may include the whole of the first value image 320a, the second mark range 322b may include the whole of the second value image 320b, the third mark range 322c may include the whole of the third value image 320c, the fourth mark range 322d may include the whole of the fourth value image 320d, the fifth mark range 322e may include the whole of the fifth value image 320e, and the sixth mark range 322f may include the whole of the sixth value image 320f. Further, the revolving speed of the engine of 0 r/min is mapped to the angle θ1, the revolving speed of the engine 1000 r/min is mapped to the angle θ2, the revolving speed of the engine 2000 r/min is mapped to the angle θ3, the revolving speed of the engine 3000 r/min is mapped to the angle θ4, the revolving speed of the engine 4000 r/min is mapped to the angle θ5, and the revolving speed of the engine 5000 r/min is mapped to the angle θ6.

The display control unit 228 maintains the correspondence between the revolving speed of the engine and the pointer angle and identifies the pointer angle from the revolving speed of the engine. When the revolving speed of the engine is 1000 r/min, for example, the display control unit 228 identifies the angle θ2 as the pointer angle. When the identified pointer angle is included in the mark range 322, the display control unit 228 determines that the pointer image 302 points to the mark image 304 or that the pointer image 302 overlaps the mark image 304. When the pointer angle is not included in the mark range 322, on the other hand, the display control unit 228 determines that the pointer image 302 does not point to the mark image 304 or that the pointer image 302 does not overlap the mark image 304.

Figure 5B:
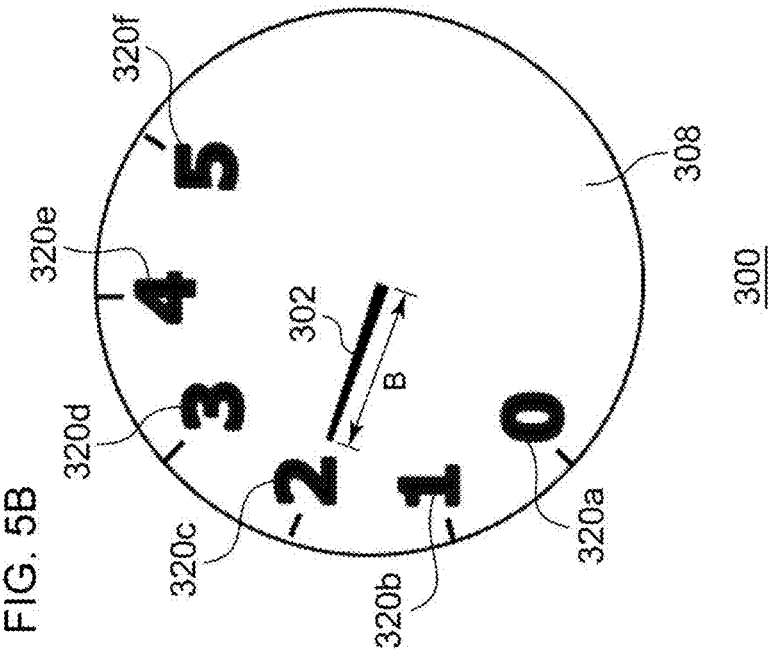
FIGS. 5A-5B show examples of the meter image displayed on the display panel of FIG. 2.
Figure 5A:
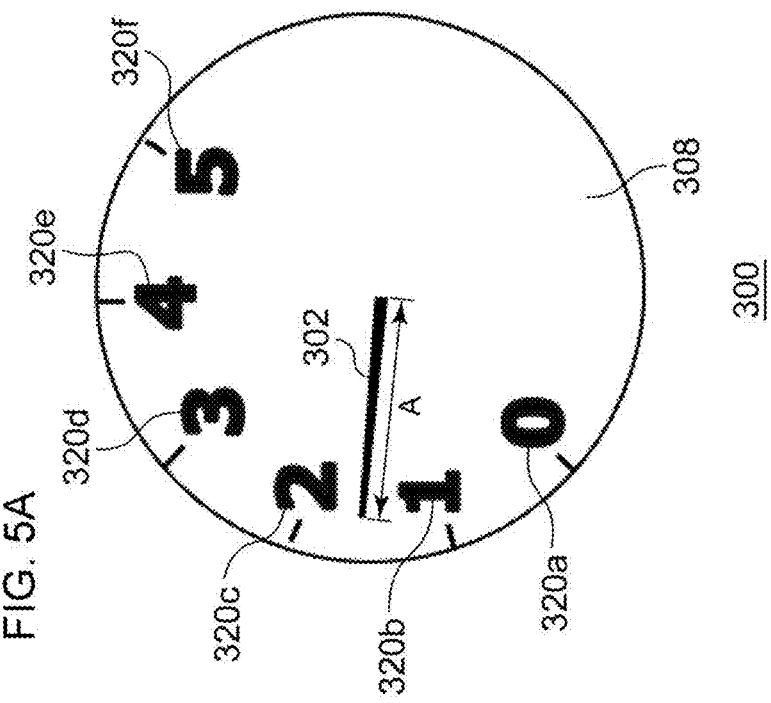

FIGS. 5A-5B show examples of the meter image 300 displayed on the display panel 212. FIG. 5A shows the meter image 300 displayed in the case that the display control unit 228 determines that the pointer image 302 does not point to any mark image 304. The pointer image 302 does not point to any of the first value image 320a through the sixth value image 320f. The length of the pointer image 302 is "A". The length "A" is a length that makes the pointer image 302 and the value image 320 to overlap at least in part when the pointer image 302 points to one of the value images 320.

FIG. 5B shows the meter image 300 displayed in the case that the display control unit 228 determines that the pointer image 302 points to the mark image 304 (e.g., the third value image 320c). The pointer image 302 points to the third value image 320c. The length of the pointer image 302 is "B". The length "B" is a length that does not make the pointer image 302 and the third value image 320c to overlap even when the pointer image 302 points to the third value image 320c. In other words, the length "A" is smaller than the length "B". The length of the pointer image 302 pointing to the value image 320 other than the third value image 320c is also configured to be "B".

Given that the display mode of the pointer image 302 of the length "A" is referred to as "first display mode", the display mode of the pointer image 302 of the length "B" is referred to as "second display mode". The display control unit 228 configures the length of the pointer image 302 displayed in the second display mode to be smaller than the length of the pointer image 302 displayed in the first display mode.

The features are implemented in hardware such as a central processing unit (CPU), a memory, or other large scale integration (LSI), of any computer and in software such as a program loaded into a memory. The figure depicts functional blocks implemented by the cooperation of these elements. Therefore, it will be understood by those skilled in the art that the functional blocks may be implemented in a variety of manners by hardware only or by a combination of hardware and software.

Figure 6:
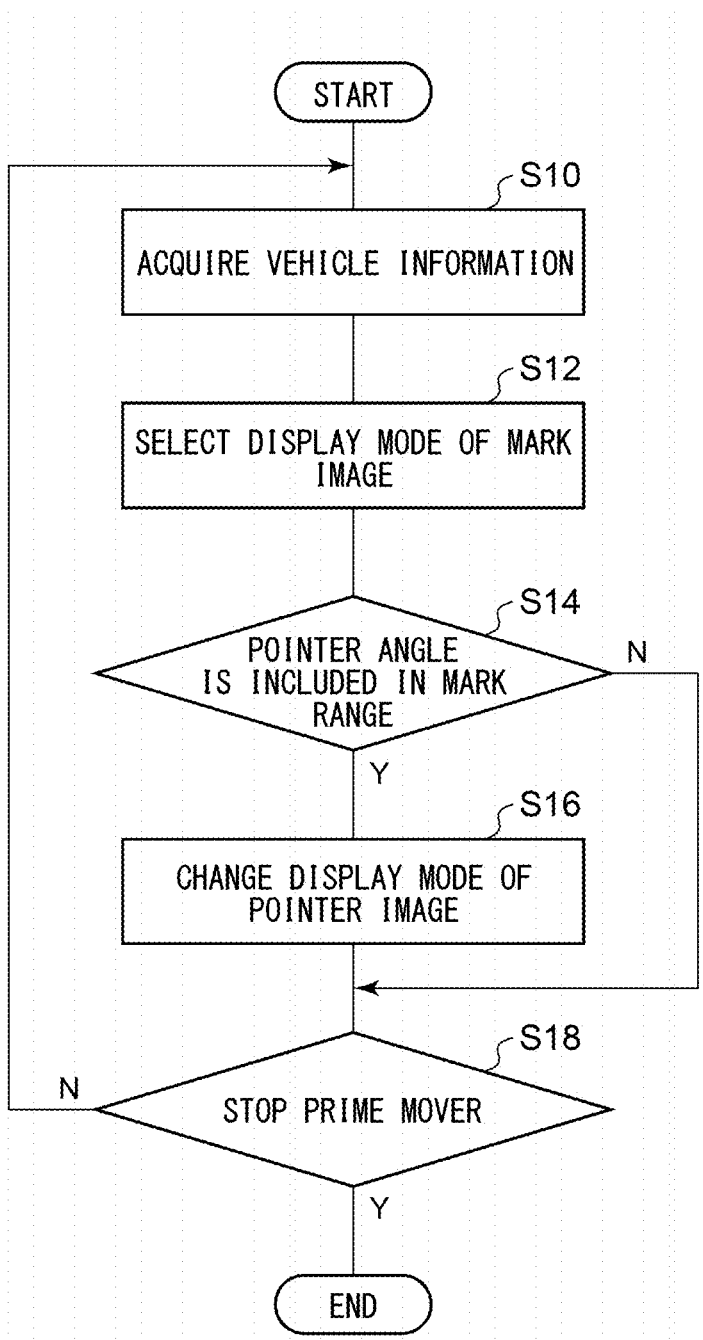
FIG. 6 is a flowchart showing a sequence of display steps performed by the display apparatus of FIG. 2.

A description will be given of the operation of the display apparatus 200 having the above-described configuration. FIG. 6 is a flowchart showing a sequence of display steps performed by the display apparatus 200. The display control unit 228 acquires vehicle information (S10). The display control unit 228 selects a display mode of the mark image 304 (S12). When the pointer angle is included in the mark range (Y in S14), the display control unit 228 changes the display mode of the relevant pointer image 302 (S16). When the pointer angle is not included in the mark range (N in S14), step 16 is skipped. When the prime mover of the vehicle 10 (e.g., the engine or the motor) is not stopped (N in S18), control returns to step 10. When the prime mover of the vehicle 10 is stopped (Y in S18), the process is terminated.

Figure 7A:
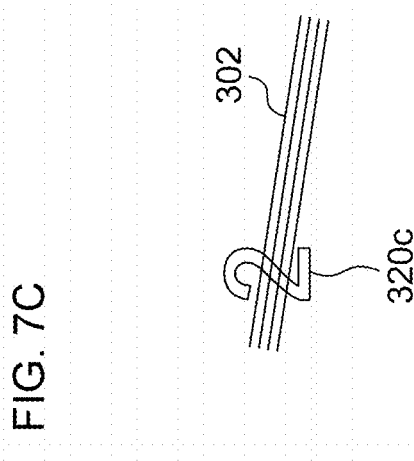
FIGS. 7A-7C show further examples of the meter image displayed on the display panel of FIG. 2.
Figure 7B:
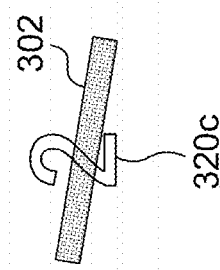
Figure 7C:
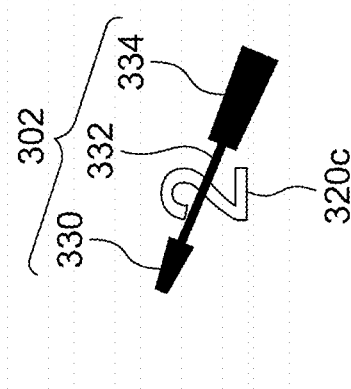

A description will be given below of a variation of the second display mode of the pointer image 302 with reference to FIGS. 7A-7C. FIGS. 7A-7C show further examples of the meter image 300 displayed on the display panel 212. The meter image 300 displayed when the display control unit 228 determines that the pointer image 302 does not point to any of the value images 320 is as shown in FIG. 5A and is displayed in the first display mode. The meter image 300 displayed when the display control unit 228 determines that the pointer image 302 points to one of the value images 320 is displayed in the second display mode, as shown in FIGS. 7A-7C.

The pointer image 302 in FIG. 7A includes a tip section 330, a thin-profile section 332, and a thick-profile section 334. The tip section 330 is provided at the tip, and the thick-profile section 334 is provided at the root. The thin-profile section 332 is provided between the tip section 330 and the thick-profile section 334 and in a part that can overlap the third value image 320c. The width of the thin-profile section 332 is smaller than the width of the tip section 330 and the thick-profile section 334. The width of the tip section 330 and the thick-profile section 334 is substantially the same as the width of the pointer image 302 displayed in the first display mode. The term "substantially" means that a margin of errors is included. The display control unit 228 configures the width of the thin-profile section 332 of the pointer image 302 in the second display mode to be smaller than the width of the pointer image 302 displayed in the first display mode. This makes it less likely that the value image 320 is shielded from view by the pointer image 302 even when the pointer image 302 and the value image 320 overlap. Stated otherwise, the display area of the value image 320 is increased.

The pointer image 302 in FIG. 7B is shown in a mesh form. The value image 320 is exposed through the interspaces in the mesh. Meanwhile, the pointer image 302 displayed in the first display mode is completely filled with a color. The pointer image 302 in FIG. 7C is shown in a slit form. The value image 320 is exposed through the interspaces of the slit.

According to the embodiment, the display mode of the pointer image is changed depending on whether the pointer image points to the mark image. Therefore, a drop in the visibility of the meter image is suppressed. Further, the length of the pointer image pointing to the mark image is configured to be smaller than the length of the pointer image not pointing to the mark image. Therefore, the mark image is made easily viewable even when the pointer image points to the mark image. Further, the width of the pointer image pointing to the mark image is configured to be smaller than the width of the pointer image not pointing to the mark image. Therefore, the mark image is made easily viewable even when the pointer image overlaps the mark image. Further, the pointer image pointing to the mark image is displayed in a mesh form. Therefore, the mark image is made easily viewable even when the pointer image overlaps the mark image. Further, the pointer image pointing to the mark image is displayed in a slit form. Therefore, the mark image is made easily viewable even when the pointer image overlaps the mark image.

Embodiment 2

A description will now be given of embodiment 2. In embodiment 1, the mode of the pointer image, e.g., the form, is changed when the mark image and the pointer image overlap. In embodiment 2, whether the pointer image is superimposed on the mark image or vice versa is changed depending on whether the movement of the pointer image is fast or slow, when the mark image and the pointer image overlap. The vehicle 10, the display apparatus 200, and the display panel 212 according to embodiment 2 are as similarly shown in FIG. 1 through FIG. 3. A description will now be given of the difference from embodiment 1.

The display control unit 228 determines whether the pointer image 302 points to the mark image 304 or the pointer image 302 does not point to the mark image 304 by performing the same process as that of embodiment 1. The process in the display control unit 228 in the case the pointer image 302 does not point to the mark image 304 is the same as described above so that a description thereof is omitted. When the pointer image 302 points to the mark image 304, on the other hand, the display control unit 228 derives an amount of change, per unit time, in information that is included in the vehicle information and that should be indicated by the pointer image 302. When the information is information on the revolving speed of the engine, the display control unit 228 derives an amount of change in the revolving speed of engine per unit time. When the information is vehicle speed information, the display control unit 228 may derive an amount of change in the vehicle speed per unit time. When the information is fuel cost information, the display control unit 228 may derive an amount of change in the fuel cost per unit time. When the amount of change per unit time is smaller than a threshold value, the display control unit 228 determines that a low-speed change state has set in. When the amount of change per unit time is equal to or greater than the threshold value, the display control unit 228 determines that a high-speed change state has set in.

Figure 8A:
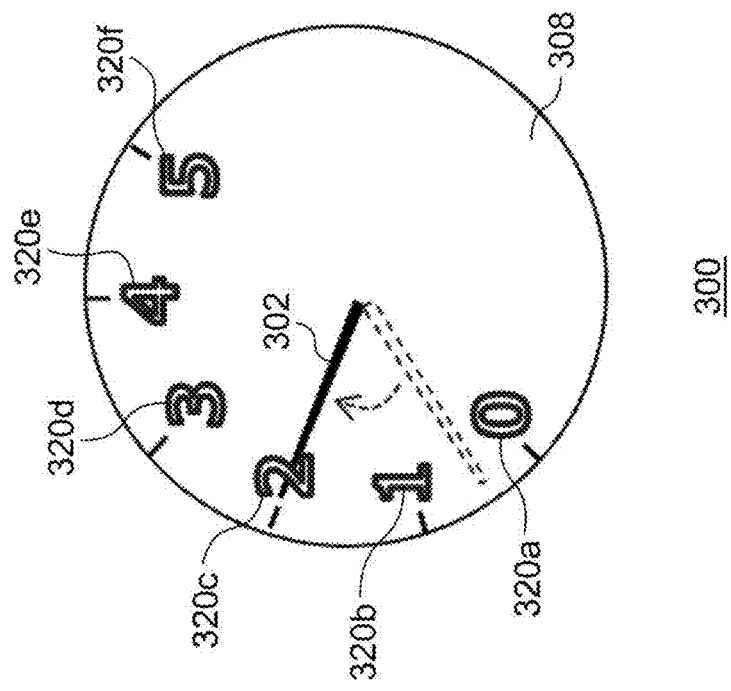
FIGS. 8A-8B show still further examples of the meter image displayed on the display panel according to embodiment 2.
Figure 8B:
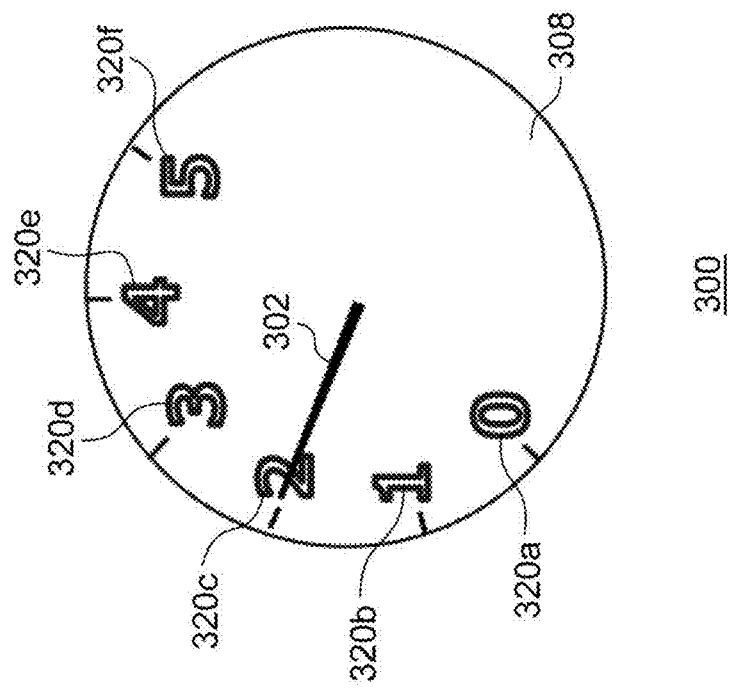

FIGS. 8A-8B show still further examples of the meter image 300 displayed on the display panel 212. FIG. 8A shows the meter image 300 displayed when the display control unit 228 determines that the pointer image 302 points to the mark image 304 and a low-speed change state has set in. A low-speed change state can be said to be a case in which the amount of movement of the pointer image 302 per unit time is smaller than the threshold value. In this case, the pointer image 302 is displayed superimposed on the value image 320, e.g., the third value image 320c. Such a display mode may be referred to as "low-speed change display mode".

FIG. 8B shows the meter image 300 displayed when the display control unit 228 determines that the pointer image 302 points to the mark image 304 and a high-speed change state has set in. A high-speed change state can be said to be a case in which the amount of movement of the pointer image 302 per unit time is equal to or greater than the threshold value. In this case, the value image 320, e.g., the third value image 320c, is displayed superimposed on the pointer image 302. Such a display mode may be referred to as "high-speed change display mode". The low-speed change display mode may be referred to as the first display mode, and the high-speed change display mode may be referred to as the second display mode.

Figure 9:
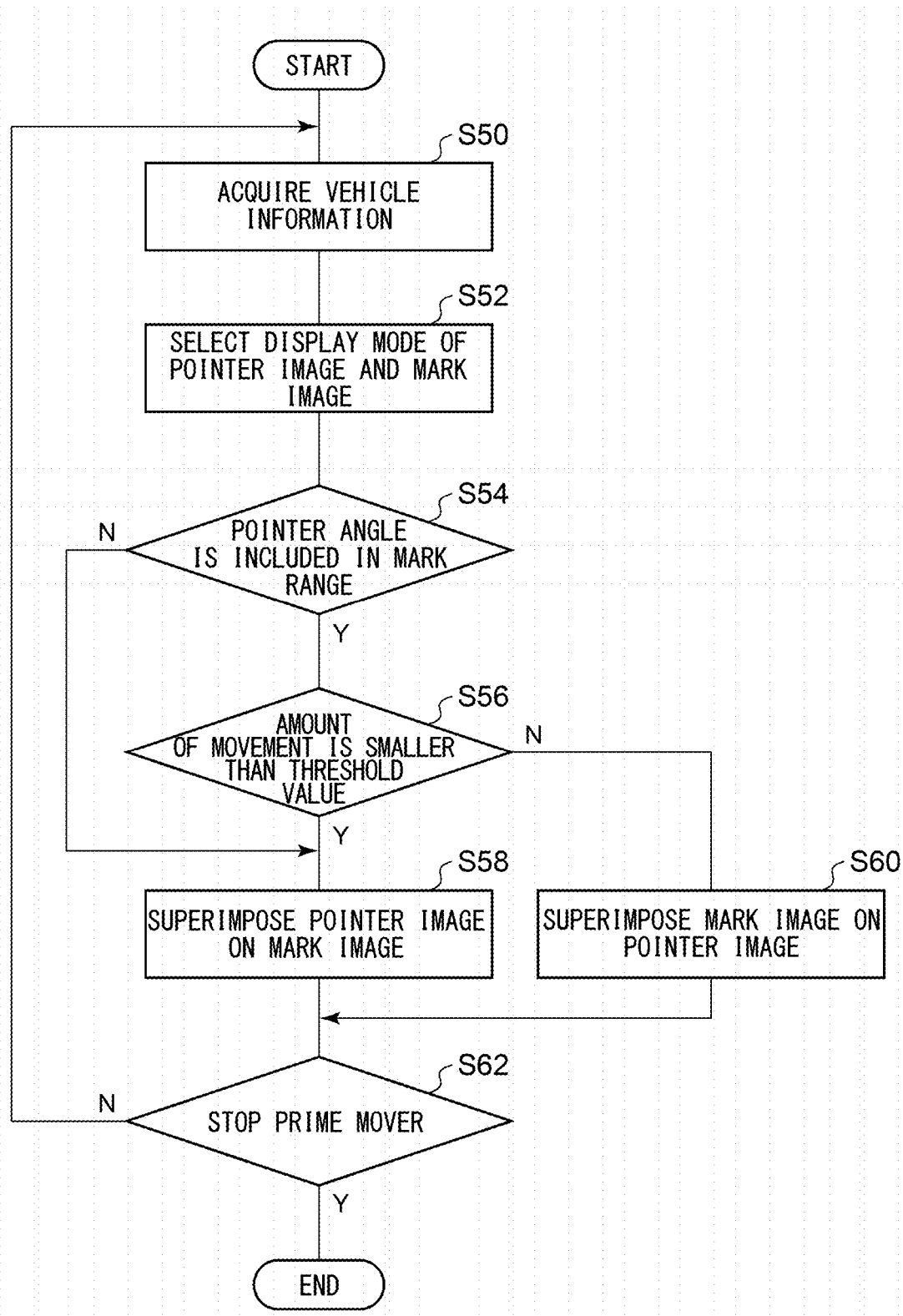
FIG. 9 is a flowchart showing a sequence of display steps performed by the display apparatus according to embodiment 2.

A description will be given of the operation of the display apparatus 200 having the above-described configuration. FIG. 9 is a flowchart showing a sequence of display steps performed by the display apparatus 200. The display control unit 228 acquires vehicle information (S50). The display control unit 228 selects a display mode of the pointer image 302 and the mark image 304 (S52). When the pointer angle is included in the mark range (Y in S54) and when the amount of movement is smaller than the threshold value (Y in S56), the display control unit 228 superimposes the pointer image 302 on the mark image 304 (S58). When the amount of movement is not smaller than the threshold value (N in S56), the display control unit 228 superimposes the mark image 304 on the pointer image 302 (S60). When the pointer angle is not included in the mark range (N in S54), the pointer image 302 is superimposed on the mark image 304 (S58). When the prime mover of the vehicle 10 (e.g., the engine or the motor) is not stopped (N in S62), control returns to step 10. When the prime mover of the vehicle 10 is stopped (Y in S62), the process is terminated.

According to the embodiment, the display mode of the pointer image and the mark image is changed when the pointer image points to the mark image, depending on whether the amount of movement of the pointer image is equal to or greater than the threshold value. Therefore, a drop in the visibility of the meter image is suppressed even when the pointer is moving. Further, the pointer image is displayed on the mark image when the amount of movement of the pointer image is smaller than the threshold value, and the mark image is displayed on the pointer image when the amount of movement of the pointer image is equal to or greater than the threshold value. Therefore, the visibility of the mark image is improved.

A description will now be given of variations.

Variation 1

In embodiment 1 and in embodiment 2, the image of the tachometer, i.e., the third meter image 300c of FIG. 3, is described. However, the first display mode and one of the second display mode, the low-speed change display mode, and the high-speed change display mode may be switchably used for the image of the fuel meter, i.e., the first meter image 300a of FIG. 3 and the image of the speed meter, i.e., the second meter image 300b. Alternatively, the first display mode and one of the second display mode, the low-speed change display mode, and the high-speed change display mode may be used for all of the first meter image 300a through the third meter image 300c included in the meter screen 400 of FIG. 3.

Variation 2

In variation 2, a plurality of display modes of the meter screen 400 are defined. When the display mode is switched, the meter screen 400 is switched. The display mode includes the first mode and the second mode. For example, the first mode is defined as "normal mode", and the second mode is defined as "sports mode".

FIGS. 10A-10B show examples of the meter screen 400 displayed on the display panel 212. FIG. 10A shows the meter screen 400 in the first mode, and the meter screen 400 includes the first meter image 300a, the second meter image 300b, and the third meter image 300c. Further, the meter screen 400 of FIG. 10A shows characters "Normal" above the second meter image 300b to let it know that the first mode is in effect.

Denoting the control whereby, as in embodiment 1, the pointer image 302 is displayed in the first display mode or the second display mode as the first control pattern, the display control unit 228 displays the pointer image 302 according to the first control pattern in the first mode shown in FIG. 10A. In other words, the pointer image 302 is displayed in the first display mode when the pointer image 302 does not point to the mark image 304. When the pointer image 302 points to the mark image 304, the pointer image 302 is displayed in the second display mode. The second display mode is one of FIG. 5B, and FIGS. 7A-7C.

FIG. 10B shows the meter screen 400 in the second mode, and the meter screen 400 includes the first meter image 300a, the second meter image 300b, and the third meter image 300c. Further, the meter screen 400 of FIG. 10B shows characters "Sports" above the second meter image 300b to let it know that the second mode is in effect.

Denoting the control whereby, as in embodiment 2, the pointer image 302 and the mark image 304 are displayed in the low-speed change display mode or the high-speed change display mode as the second control pattern, the display control unit 228 displays the pointer image 302 and the mark image 304 according to the second control pattern in the second mode shown in FIG. 10B. In other words, the pointer image 302 and the mark image 304 are displayed in the low-speed change display mode when the pointer image 302 points to the mark image 304 and the amount of movement of the pointer image 302 per unit time is smaller than the threshold value. Further, the pointer image 302 and the mark image 304 are displayed in the high-speed change display mode when the pointer image 302 points to the mark image 304 and the amount of movement of the pointer image 302 per unit time is equal to or greater than the threshold value. Given that the low-speed change display mode is referred to as "third display mode", the high-speed change display mode may be referred to as "fourth display mode".

Variation 3

In variation 3, too, a plurality of display modes of the meter screen 400 are defined. When the display mode is switched, the meter screen 400 is switched. The display mode includes the first mode and the second model. The size of the meter image 300 differs in the first mode and in the second mode.

Figure 11A:
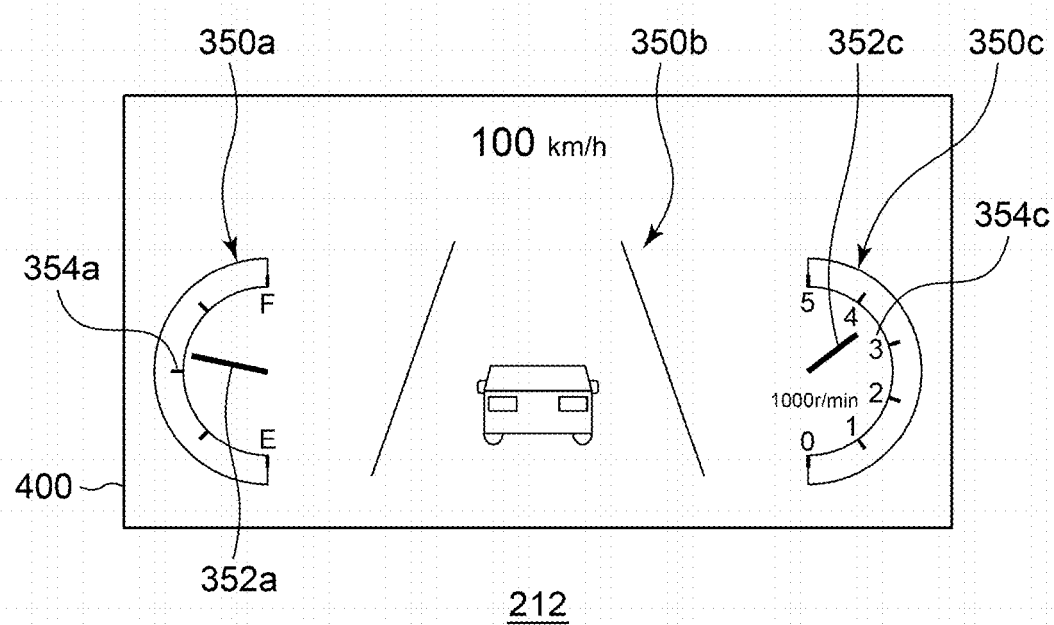
FIGS. 11A-11B show further examples of the meter screen displayed on the display panel according to variation 3.
Figure 11B:
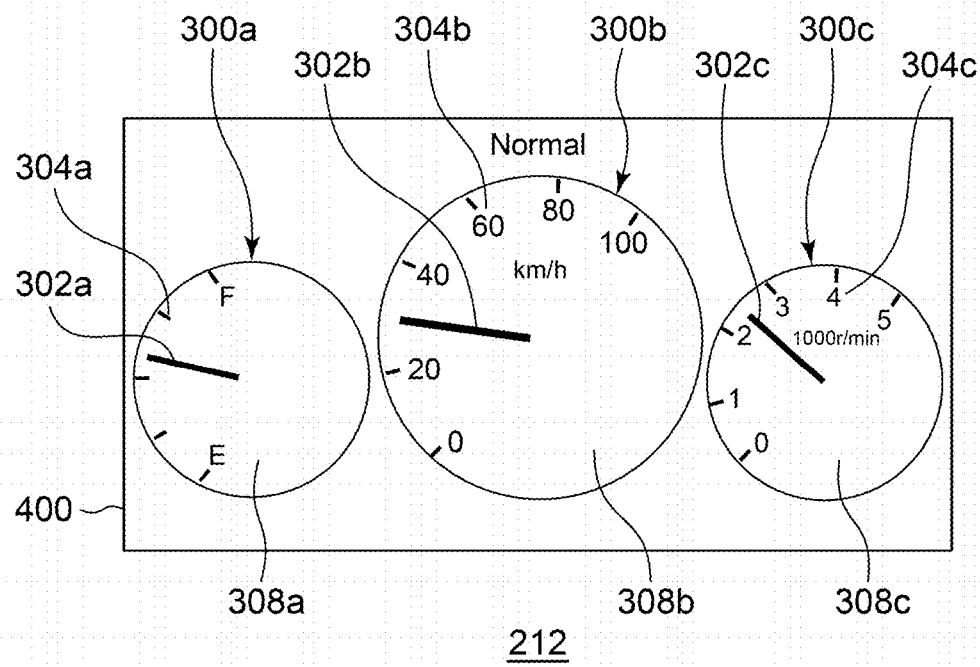

FIGS. 11A-11B show further examples of the meter screen 400 displayed on the display panel 212. FIG. 11A shows the meter screen 400 in the first mode. The screen of FIG. 11A is as similarly shown in FIG. 3. In the first mode, the display control unit 228 displays the pointer image 302 and the mark image 304 by using only the first display mode and without using the second display mode, the low-speed change display mode, or the high-speed change display mode.

FIG. 11B shows the meter screen 400 in the second mode. The meter screen 400 includes a first meter image 350a, a second meter image 350b, and a third meter image 350c. The first meter image 350a includes a first pointer image 352a and a first mark image 354a, and the third meter image 350c includes a third pointer image 352c and a third mark image 354c. The first meter image 350a and the third meter image 350c show the same detail as the first meter image 300a and the third meter image 300c, respectively. The first meter image 350a and the third meter image 350c are respectively shown in smaller sizes than the first meter image 300a and the third meter image 300c. In the second display mode, the display control unit 228 displays the pointer image 352 and the mark image 354, switchably using the first display mode and one of the second display mode, the low-speed change display mode, and the high-speed change display mode.

According to this variation, the first display mode and one of the second display mode, the low-speed change display mode, and the high-speed change display mode are switchably used for a plurality of meter images displayed on the display panel. Therefore, a drop in the visibility of the meter image is suppressed. Further, only the first display mode is used in the first mode, and the first display mode and one of the second display mode, the low-speed change display mode, and the high-speed display mode is switchably used in the second mode. Therefore, the visibility of the mark image is changed in accordance with the size of the meter image. Further, the first display mode and the second display mode are used in the first mode, and the low-speed change display mode and the high-speed change display mode are used in the second mode. Therefore, the display suited to the display mode can be executed.

One embodiment of the present disclosure is summarized below. A display apparatus according to an embodiment of the present disclosure includes: a display panel adapted to display at least one meter image including a pointer image constituting a pointer and a mark image constituting a mark that the pointer is adapted to point to; a processor; and a memory that stores a program, wherein the processor reads the program to control display of the mark image on the display panel, the processor causes the pointer image to be displayed on the display panel in a first display mode when the pointer image does not point to the mark image and causes the pointer image to be displayed on the display panel in a second display mode when the pointer image points to the mark image, and the first display mode and the second display mode are different.

The processor causes the meter image to be displayed on the display panel by configuring a length of the pointer image displayed in the second display mode to be smaller than a length of the pointer image displayed in the first display mode.

The processor causes the meter image to be displayed on the display panel by configuring a width of the pointer image displayed in the second display mode to be smaller than a width of the pointer image displayed in the first display mode.

The processor causes the pointer image to be displayed on the display panel in a mesh form in the second display mode.

The processor causes the pointer image to be displayed on the display panel in a slit form in the second display mode.

Another embodiment of the present disclosure relates to a display apparatus. The apparatus includes: a display panel adapted to display at least one meter image including a pointer image constituting a pointer and a mark image constituting a mark that the pointer is adapted to point to; a processor; and a memory that stores a program, wherein the processor reads the program to control display of the mark image on the display panel, the processor causes the pointer image and the mark image to be displayed on the display panel in a first display mode when the pointer image points to the mark image and an amount of movement of the pointer image per unit time is smaller than a threshold value and causes the pointer image and the mark image to be displayed on the display panel in a second display mode when the pointer image points to the mark image and the amount of movement of the pointer image per unit time is equal to or greater than the threshold value, and the first display mode and the second display mode are different.

The processor causes the pointer image and the mark image by superimposing the pointer image on the mark image in the first display mode and superimposing the mark image on the pointer image in the second display mode.

The at least one meter image includes a first meter image and a second meter image, and the processor causes the first meter image and the second meter image to be displayed on the display panel, switchably using the first display mode and the second display mode.

The at least one meter image is displayed in a first mode or a second mode, in the first mode, the processor causes the meter image to be displayed on the display panel by using only the first display mode, and in the second mode, the processor causes the meter image to be displayed on the display panel, switchably using the first display mode and the second display mode.

The at least one meter image is displayed in a first mode or a second mode, the processor uses a first control pattern in the first mode and uses a second control pattern in the second mode, in the first control pattern, the processor causes the pointer image to be displayed on the display panel in the first display mode when the pointer image does not point to the mark image and causes the pointer image to be displayed on the display panel in the second display mode when the pointer image points to the mark image, in the second control pattern, the processor causes the pointer image and the mark image to be displayed on the display panel in a third display mode when the pointer image points to the mark image and an amount of movement of the pointer image per unit time is smaller than a threshold value and causes the pointer image and the mark image to be displayed on the display panel in a fourth display mode when the pointer image points to the mark image and the amount of movement of the pointer mage per unit time is equal to or greater than the threshold value, and the third display mode and the fourth display mode are different.

The processor causes the pointer image and the mark image by superimposing the pointer image on the mark image in the third display mode and superimposing the mark image on the pointer image in the fourth display mode.

Described above is an explanation of the present disclosure based on the embodiment. The embodiment is intended to be illustrative only and it will be understood by those skilled in the art that various modifications to constituting elements and processes could be developed and that such modifications are also within the scope of the present disclosure.

While various embodiments have been described herein above, it is to be appreciated that various changes in form and detail may be made without departing from the spirit and scope of the invention(s) presently or hereafter claimed.

CROSS-REFERENCE TO RELATED APPLICATION

This application is based upon and claims the benefit of priority from the prior Japanese Patent Application No. 2022-034365, filed on Mar. 7, 2022, the entire contents of which are incorporated herein by reference.

What is claimed is:

1. A display apparatus, comprising:
a display panel adapted to display at least one meter image, the at least one meter image including a pointer image constituting a pointer and a mark image constituting a mark to which the pointer is adapted to point; and
a display controller that controls the display panel, wherein
the display controller causes the display panel to display the pointer image in a first display mode when the pointer image does not point to the mark image and causes the display panel to display the pointer image in a second display mode when the pointer image points to the mark image,
the first display mode and the second display mode are different, and
the display panel displays the pointer image in a mesh form in the second display mode.

2. The display apparatus according to claim 1, wherein
the at least one meter image includes a first meter image and a second meter image, and
the display panel displays the first meter image and the second meter image, switchably using the first display mode and the second display mode.

3. The display apparatus according to claim 1, wherein
the at least one meter image is displayed in a first mode or a second mode,
in the first mode, the display panel displays the at least one meter image by using only the first display mode, and
in the second mode, the display panel displays the at least one meter image, switchably using the first display mode and the second display mode.

4. The display apparatus according to claim 1, wherein
the at least one meter image is displayed in a first mode or a second mode,
the display controller uses a first control pattern in the first mode and uses a second control pattern in the second mode,
in the first control pattern, the display controller causes the display panel to display the pointer image in the first display mode when the pointer image does not point to the mark image and causes the display panel to display the pointer image in the second display mode when the pointer image points to the mark image,
in the second control pattern, the display controller causes the display panel to display the pointer image and the mark image in a third display mode when the pointer image points to the mark image and an amount of movement of the pointer image per unit time is smaller than a threshold value and causes the display panel to display the pointer image and the mark image in a fourth display mode when the pointer image points to the mark image and the amount of movement of the pointer mage per unit time is equal to or greater than the threshold value, and
the third display mode and the fourth display mode are different.

5. The display apparatus according to claim 4, wherein
the display controller causes the display panel to display the pointer image and the mark image by superimposing the pointer image on the mark image in the third display mode and superimposing the mark image on the pointer image in the fourth display mode.

6. A display apparatus, comprising:
a display panel adapted to display at least one meter image, the at least one meter image including a pointer image constituting a pointer and a mark image constituting a mark that to which the pointer is adapted to point to; and
a display controller that controls the display panel, wherein
the display controller causes the display panel to display the pointer image and the mark image in a first display mode when the pointer image points to the mark image and an amount of movement of the pointer image per unit time is smaller than a threshold value and causes the display panel to display the pointer image and the mark image in a second display mode when the pointer image points to the mark image and the amount of movement of the pointer image per unit time is equal to or greater than the threshold value,
the first display mode and the second display mode are different, and
the display panel displays the pointer image in a mesh form in the second display mode.

7. The display apparatus according to claim 6, wherein
the display panel displays the pointer image and the mark image by superimposing the pointer image on the mark image in the first display mode and superimposing the mark image on the pointer image in the second display mode.

* * * * *